United States Patent [19]

Smith

[11] Patent Number: 5,149,161
[45] Date of Patent: Sep. 22, 1992

[54] COOKIE DROPPER

[76] Inventor: Franklin G. Smith, 2944 S.E. Tibbetts, Portland, Oreg. 97202

[21] Appl. No.: 620,364

[22] Filed: Nov. 29, 1990

[51] Int. Cl.[5] ............................. A47J 43/28
[52] U.S. Cl. ........................ 294/26.5; 294/7; 294/50
[58] Field of Search ............ 294/1.1, 7, 8, 26.5, 294/33, 50, 99.2; 30/124, 128-130, 150; 425/286, 276, 278, 279, 281, 282, 284; D7/672-674, 688, 691

[56] References Cited

U.S. PATENT DOCUMENTS

| | | |
|---|---|---|
| 510,286 | 12/1893 | Osterman . |
| 619,949 | 2/1899 | Flynn .................................. 294/99.2 |
| 961,429 | 6/1910 | Clark . |
| 1,016,711 | 2/1912 | Roller . |
| 1,321,594 | 11/1919 | Burlingame .................... 294/99.2 |
| 1,481,890 | 1/1924 | Causey . |
| 2,010,074 | 8/1935 | Fuerst ........................... 294/99.2 X |
| 2,563,422 | 8/1951 | Sabo ............................... 294/99.2 X |
| 2,660,784 | 12/1953 | Greene . |
| 2,916,320 | 12/1959 | Adams ............................ 294/26.5 |
| 3,091,270 | 5/1963 | Sampson ....................... 294/99.2 X |
| 3,208,404 | 9/1965 | Schlessel . |
| 3,492,039 | 1/1970 | Chmela ................................ 294/7 |
| 4,044,771 | 8/1977 | Wannag ........................ 294/99.2 X |

FOREIGN PATENT DOCUMENTS 1363979  5/1964  France ............................. 294/99.2

OTHER PUBLICATIONS

Package backing for a Fairgrove stainless steel cookie dropper, (3 photographs of the Fairgrove stainless steel cookie dropper) Cat. No. 417, copyright 1983.

*Primary Examiner*—Johnny D. Cherry
*Attorney, Agent, or Firm*—Klarquist, Sparkman, Campbell, Leigh & Whinston

[57] ABSTRACT

A manual device for depositing cookie dough onto baking sheets includes a unitary plastic body having two connected arms. The first arm terminates in a flat spatula used for scooping up and temporarily retaining portions of cookie dough. The second arm terminates in two parallel and offset fingers connected together at each end to form a ram with a slot extending therethrough. The flat spatula and slotted ram are constructed such that the spatula fits through the slot. The ram is passed over the spatula face to clear it of the cookie dough portion.

2 Claims, 1 Drawing Sheet

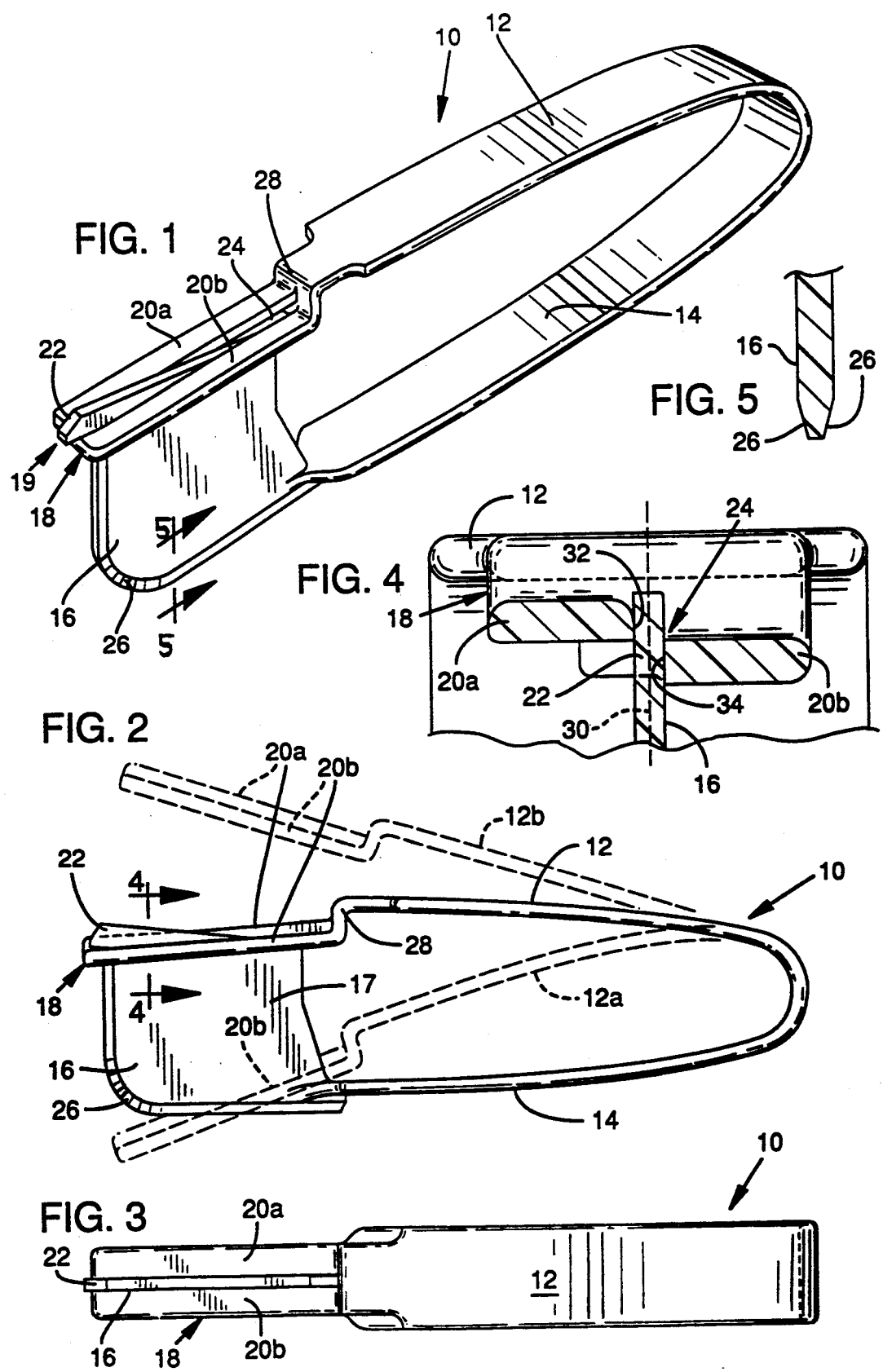

COOKIE DROPPER

FIELD OF THE INVENTION

The present invention relates to manual devices for deposition of cookie dough onto baking sheets.

BACKGROUND OF THE INVENTION

Typically, cookie batter or dough is placed on cookie pans or baking sheets with the use of an ordinary teaspoon. A baker uses the spoon to scoop and retain a portion of a batch of cookie dough. The dough portion is held over a baking sheet and pushed off the spoon with an index finger.

Cookie droppers are devices that replace spoons in the cookie-making process and eliminate the need for touching each dough portion with a finger. One such device includes two joined metal arms; one arm terminating in a flat spatula and the other in a ram. The dropper is held in one hand and is used to scoop a portion of dough onto the spatula. The dropper is then held over a baking sheet. As the user squeezes the dropper's two arms together, the ram passes over part of the spatula. The moving ram thus pushes the cookie dough off the spatula and onto the baking sheet.

Cookie droppers are usually made of stainless steel with the different elements being machined separately and assembled in stages. These metal cookie droppers, although functional, are constructed with folded parts that trap cookie dough. The trapped dough sticks to the dough portion on the spatula and hinders subsequent deposition of dough portions.

The dough trapped in the crevices of the metal folds eventually hardens. Hence, the folded metal features and other surface irregularities (such as the spot weld or rivets employed to hold the various metal elements together) make these droppers hard to clean. Moreover, the sharp edges created in stamping these droppers can scrape and cut the user during both cleaning and use.

SUMMARY OF THE INVENTION

The cookie dropper formed in accordance with the present invention is constructed of a single piece of plastic. The unitary construction allows for cost efficient manufacture and easy assembly of the dropper as well as rapid and thorough cleaning. The dropper is constructed with rounded edges to prevent injury.

The dropper includes a ram and spatula arrangement that enables the ram to pass completely over the spatula face providing effective removal of dough portions from the spatula. The dropper is configured without dough-trapping features that clog and waste dough.

The present invention particularly includes a unitary plastic body having two connected and opposing elongate arms defining a substantially U-shaped structure. The first arm terminates in a flat spatula used for scooping up and temporarily retaining portions of cookie dough. The second arm terminates in two parallel fingers. These fingers are connected together at each end to form a ram with a slot extending through the ram.

The flat spatula and slotted ram are constructed and aligned such that the spatula fits through the slotted ram. After passing through the slotted ram, the spatula is retained within the slot by the abutment between a protruding tab on the spatula and an end of the slotted ram.

The plastic used to make the dropper is of a thickness and density sufficient to provide ample resilience in the dropper to allow for bending of the arms to move the ram over the spatula for rapid and continuous deposition of cookie dough. After the ram moves over the spatula, the resilience of the dropper arms moves the ram back to its initial position so that another dough portion may be scooped by the spatula.

As another aspect of this invention, the ram fingers are offset to allow the dropper to be constructed of injection-molded plastic using a simple two-part mold. Once molded, the dropper is easily assembled for operation. Construction costs for the dropper are, therefore, minimized and production and assembly is simplified.

BRIEF DESCRIPTION OF THE DRAWINGS

FIG. 1 is a perspective view of a cookie dropper constructed in accordance with the present invention.

FIG. 2 is a side elevation view of the dropper.

FIG. 3 is a top plan view of the dropper showing a single arm terminating in two fingers forming the slotted ram with spatula seated therein.

FIG. 4 is an enlarged sectional view taken along line 4—4 of FIG. 2.

FIG. 5 is an enlarged sectional view taken along line 5—5 of FIG. 1.

DETAILED DESCRIPTION OF THE PREFERRED EMBODIMENT

Referring to the drawings, the cookie dropper 10 of the present invention includes a unitary, substantially solid, molded plastic body formed into two opposing arms 12 and 14 (FIGS. 1 and 2). The first arm 12 terminates in a ninety degree bend 28.

Two parallel, spaced-apart fingers 20a, 20b extend from the bend 28. These fingers are connected at outermost ends 19 to form a closed slot 24. The fingers 20a, 20b are offset in elevation, as shown most clearly in FIG. 4. This offset relationship permits the dropper 10 (including closed slot 24) to be injection-molded with a simple, two-part mold, as described more fully below. The combination of the bend 28, the fingers 20a and 20b, and the resulting slot 24 forms a ram 18.

As shown in FIGS. 1 and 2, the second arm 14 terminates in a flat spoon or spatula 16 with beveled edges 26. The spatula provides a smooth, stable surface 17 for dipping into a batch of cookie dough. The spatula includes a protruding tab 22 which abuts the connected ends 19 of the fingers 20a, 20b to retain the spatula 16 within the slotted ram 18. The tab 22 is a flat member, no thicker than the spatula 16, thereby allowing easy disengagement of the spatula 16 from the slotted ram 18 as described below.

Referring again to FIG. 2, the dropper 10 is molded with one arm 12 displaced from the other arm 14, as indicated by dashed lines 12b. This orientation of the arms permits formation of the apparatus with the simple two-part mold mentioned above. The two parts of the mold (not shown) will meet near a central vertical plane of the dropper, that plane shown as dashed line 30 in FIG. 4. In the region within the slot 24, one mold part extends across the center plane 30 to abut (i.e., define) the inner surface 32 of one finger 20a. The opposing mold part will extend across the plane 30 to abut the inner surface 34 of the other finger 20b. (FIG. 4 depicts the dropper in the closed or assembled position. As mentioned, however, the spatula 16 is not disposed within the slot 24 during the molding process.)

In view of the above, it can be appreciated that the offset arrangement of the fingers 20a, 20b permits molding of the ram 18 with a closed slot 24, without employing a complex mold structure that includes a side-core pull mechanism.

The dropper 10 is quickly assembled by manually bending the resilient arms 12, 14 so that the tab 22 of the spatula 16 fits through the slot 24 and rests against the connected outermost ends 19 of the fingers 20a, 20b. No folding, riveting or permanent deforming of the dropper is required to assemble the dropper 10 or to keep the dropper in the assembled position. The intrinsic resilience of the unitary plastic dropper 10 will normally urge the arms 12, 14 apart, so that the dropper 10 normally assumes the position shown in solid lines in FIG. 2. This resilience also allows for bending of the arms, such as shown by the dashed line 12a, for moving the ram 18 across the spatula face 17 to force cookie dough therefrom.

After the dropper 10 is assembled for operation as shown in FIG. 1, arms 12 and 14 are held in the user's hand. The spatula 16 is scooped through a batch of cookie dough so that a dough portion is retained on the spatula surface 17. Next, the dropper is held above a nearby pre-greased cookie sheet and the user bends arms 12, 14 to force the flat spatula to pass through the slotted ram 18. One finger 20b pushes the dough portion off the spatula surface 17.

As the arms 12, 14 are urged together, the ram finger 20b passes completely across the spatula surface 17 to completely clear the spatula surface of dough. Preferably, the offset relationship of the fingers 20a, 20b is such that the finger 20b that contacts the dough is relatively nearer the arm 14 than is the other finger 20a. This offset relationship allows finger 20b to move across substantially the entire surface 17 of the spatula to ensure that all the dough is forced from the spatula.

After the dough is forced from the spatula onto the cookie sheet, the user releases the force on the two arms and the dropper returns to its original operating position as shown by the solid lines in FIG. 2. This operation is repeated for each cookie desired.

Upon completion of the operation, the arms 12, 14 are bent to allow the tab 22 to fit through the slot 24 so that the arms move apart (arm 12 assuming position 12b in FIG. 2) for easy cleaning.

Having illustrated and described the principles of the invention with reference to one preferred embodiment, it should be apparent to those persons skilled in the art that such invention may be modified in arrangement and detail without departing from such principles.

I claim:

1. A cookie dropper comprising:

a unitary member made of one piece of resilient material and having first and second opposing arms;

the first and second arms being movable relative to one another;

the first arm terminating in a flat spatula that has a flat surface;

the second arm terminating in a ram including two parallel fingers arranged to define an enclosed slot through which the spatula fits, a finger of the ram being movable across the flat surface of the spatula, the fingers being connected at one end of the slot, and wherein the spatula includes a protruding tab having a flat surface that is coplanar with the flat surface of the spatula and that fits through the enclosed slot without bending of the tab, the resiliency of the arms normally holding the tab against the connected end of the fingers thereby to retain the spatula within the slot, and wherein the fingers are offset so that a major portion of one finger is nearer to the first arm than is the other finger.

2. The cookie dropper of claim 1 wherein the dropper is formed of injection-molded plastic.

* * * * *